Aug. 15, 1967 A. R. SCHMOYER 3,335,630
VISUAL CHORD TEACHING DEVICE
Filed June 13, 1966 4 Sheets-Sheet 1
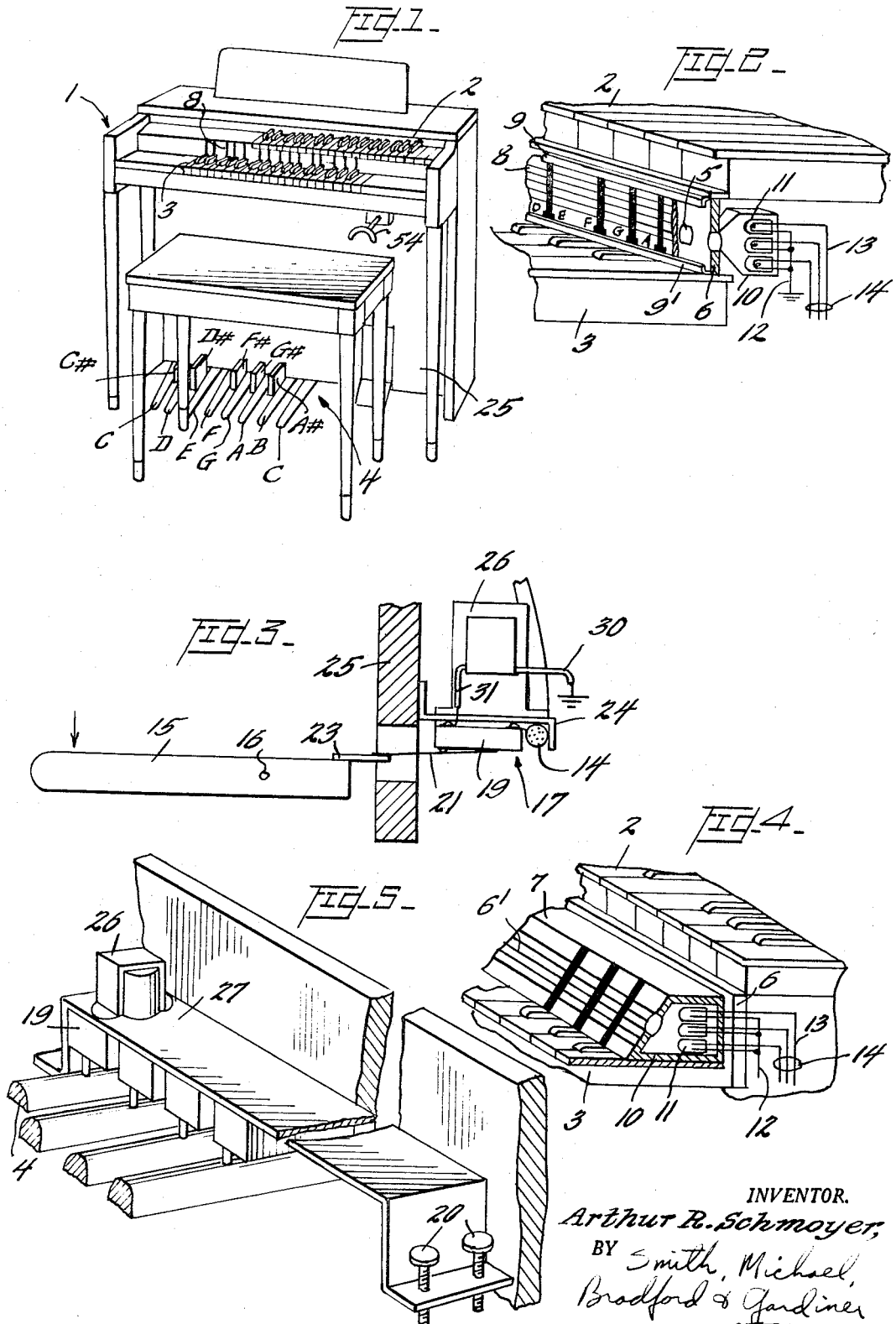

INVENTOR.
Arthur R. Schmoyer
BY Smith, Michael
Bradford, & Gardiner
ATTORNEYS

Aug. 15, 1967     A. R. SCHMOYER     3,335,630
VISUAL CHORD TEACHING DEVICE
Filed June 13, 1966     4 Sheets-Sheet 4
FIG. 8.
FUNDAMENTAL MAJOR     MINOR FINGER NO.3 DOWN ½ STEP
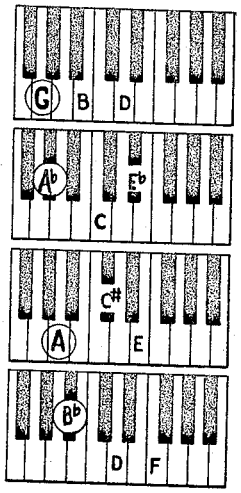
- Ⓖ B D    5 3 1
- Ⓐᵇ C Eᵇ    5 3 1
- Ⓐ C# E    5 3 1
- Ⓑᵇ D F    5 3 1
2ⁿᵈ INVERSION MAJOR     MINOR FINGER NO.1 DOWN ½ STEP
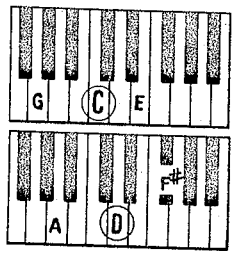
- G Ⓒ E    5 2 1
- A Ⓓ F#    5 2 1
1ˢᵗ INVERSION MAJOR     MINOR FINGER NO.5 DOWN ½ STEP
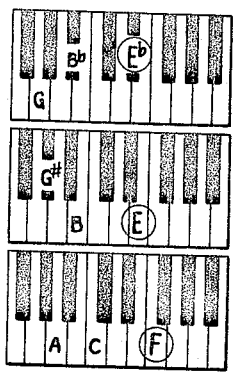
- G Bᵇ Ⓔᵇ    5 3 1
- G# B Ⓔ    5 3 1
- A C Ⓕ    5 3 1
INVENTOR
*Arthur R. Schmoyer,*
BY *Smith, Michael,*
*Bradford & Gardiner*
ATTORNEY

3,335,630
VISUAL CHORD TEACHING DEVICE
Arthur R. Schmoyer, P.O. Box 30,
Beallesville, Md. 20704
Filed June 13, 1966, Ser. No. 557,280
9 Claims. (Cl. 84—478)

ABSTRACT OF THE DISCLOSURE

A teaching device for a keyboard instrument which provides a visual indication of the appropriate keys to be depressed in playing a chord in response to the depression of a clavial key appropriate to the desired chord. Additional indications designate the note in the chord triad by which the chord is identified and the particular finger to be used in playing that note.

---

Figure 6:
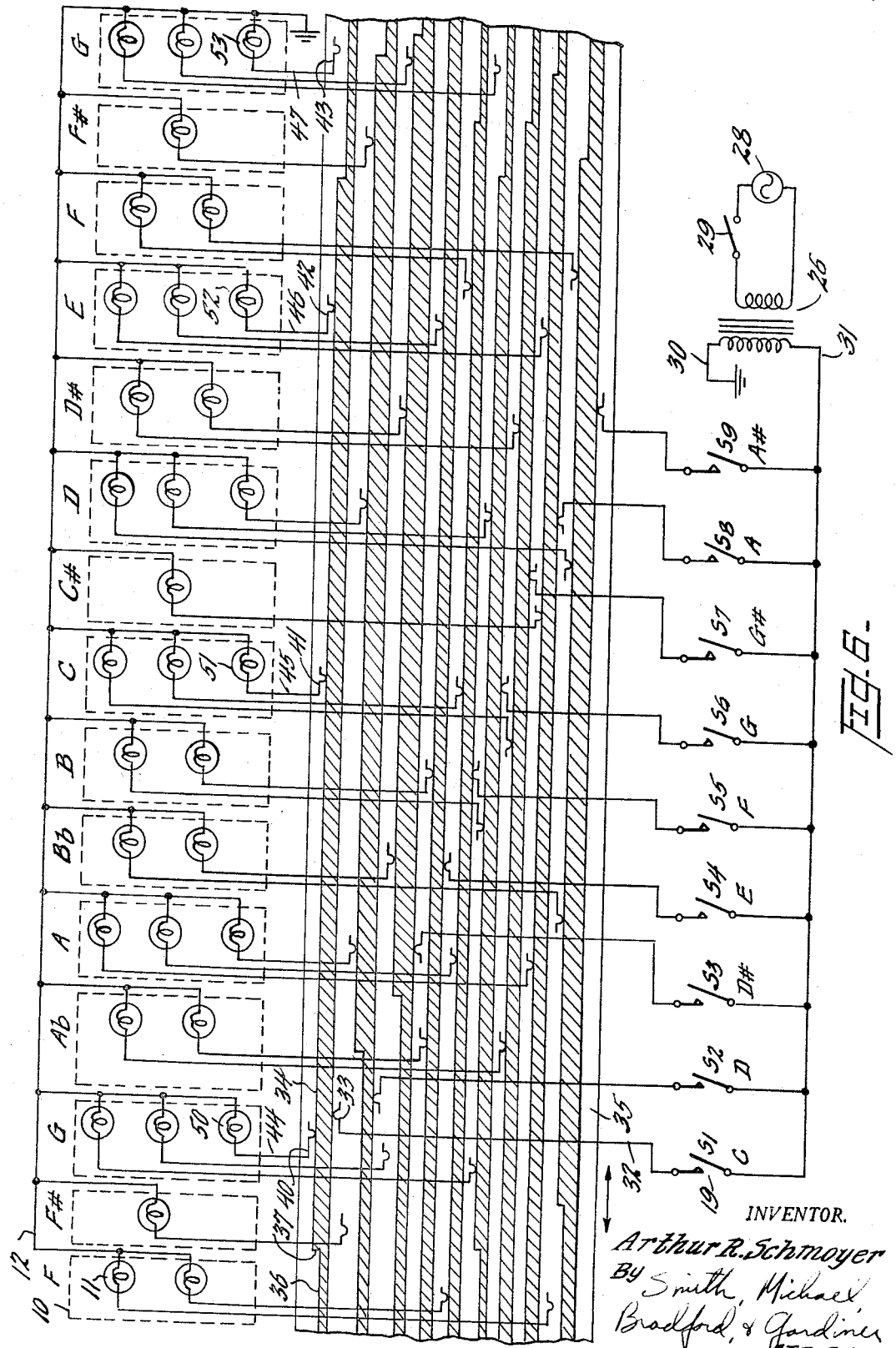

This invention relates to a visual chord teaching device for a musical instrument such as an organ. The learning process in such an instrument is complicated by the requirement that the student be able to associate a plurality of notes played on one keyboard with a corresponding note played on another somewhat remote keyboard. Specifically in connection with the organ, the student must select a plurality (triad) of keys on the manual keyboard which comprise a chord, the notes of which comprise the 1st, 3rd, and 5th notes of any scale. For each such chord there exists a bass note to be played on a pedal keyboard which is remote from the manual keyboard. The latter is, in the case of the fundamental position, the root of the bottom note of the fundamental chord, and has the effect of adding fullness to the composite sound. This invention provides a device which is effective to provide a visual indication of the appropriate association of keys of both the manual and pedal keyboards to be used in playing a chord.

Generally accepted teaching techniques in use at the present time involve instruction of the student in selection of the appropriate manual keys to be depressed in playing a particular chord, the manual keys corresponding to the chord notes appearing on the cleft of the music sheet. The student must then mentally associate with this chord the bass note to be played to fill out the chord, and physically locate the pedal key to be depressed. This thought process must be accomplished in time to permit simultaneous depression of both manual and pedal keys in order to sound the appropriate full chord. By this invention, the thought process is reversed and expedited by providing the student with an indication of the appropriate triad of manual keys to be depressed, and this indication is presented to the student simultaneously with the depression of the pedal key.

As the student progresses from basic learning to more advanced instruction, he is encouraged to attempt variations of the basic associations of pedal and manual keys, as in the use of first or second inversions wherein the bottom note of the fundamental triad is moved to the top of the triad to form the first inversion, or the bottom note of the first inversion triad is moved to the top of the triad to form the second inversion. By continuing the process of moving the bottom note to the top of the triad, the variances are repeated in the next highest octave. In attempting such variances, the student who has been instructed under the aforementioned presently accepted techniques is hampered by a tendency to release the pedal key and thereby terminate the sounding of the bass note before initiating the thought process incident to the next chord to be played. In a sustained sound instrument such as the organ, the music frequently calls for the same bass note to be held through several variances of the chord, thus the tendency to terminate the bass note at the end of each triad is a distinct disadvantage, and constitutes a stumbling block to further advancement in the learning process. In contradistinction, a student originally instructed through the use of the apparatus of this invention has associated the triad and bass notes as a unit, and is better able to adapt his thought processes to variances encountered in advanced training.

In attempts to avoid the laborious efforts inherent in the aforementioned generally accepted techniques, teaching aids utilizing light indicators to display to the student appropriate keys to be depressed have been developed. Basic among these devices are those involving a record media which produces light indications of the proper sequence of melody keys to be depressed to play a prerecorded melody, such as disclosed in U.S. Patent 1,733,477, issued Oct. 29, 1929, to E. S. Votey, and in U.S. Patent 3,069,959, issued Dec. 25, 1962, to J. Foufounis et al. Further improvements on these devices are the subject matter of my copending applications Ser. Nos. 362,360 and 424,998, filed Apr. 24, 1964, and Jan. 12, 1965, respectively. In U.S. Patent 2,820,391, issued Jan. 21, 1958, to Webster E. Janssen, there is disclosed a piano teaching device which includes indicating lights associated with the bass portion of a manual piano keyboard, and circuits responsive to the depression of a key on the treble portion of the keyboard and effective to illuminate lights indicative of an appropriate chord to be played with the melody note activated by the depressed key. U.S. Patent 3,091,152, issued May 28, 1963, to Elmer H. Bridges, discloses the activation of indicator lights by switches associated with the pedal keys of an organ, but does not suggest the association of these indicators with the chord notes.

To the end that a student may be instructed to read from the music a chord to be played and be encouraged to strike a bass note to the chord and simultaneously have indicated to him the appropriate manual keys to be depressed to play the chord triad, and further to form variations of the chord utilizing the same bass note, this invention provides a chord teaching device which comprises a plurality of indicating elements, each said element being disposed in a position of visual association with a key of a manual keyboard, a plurality of sensing means responsive to depression of a pedal keyboard, and means operatively interconnecting each sensing means with certain of the indicating elements to visually identify the manual keys to be depressed in order to play a chord appropriate to the bass note sounded by the depressed pedal.

In addition to the aforesaid instructional advantage, this invention has as its objects:

(1) The provision of a teaching device which facilitates instruction by encouraging simultaneous learning of the bass pedal and manual keys to be depressed to play a harmonically correct chord, (2) The provision of a teaching device which permits the use of conventionally written sheet music in the instructional process, (3) The provision of a teaching device which encourages the learning of chord variations, (4) The provision of a teaching device particularly adapted to a sustained note instrument, such as the organ, and (5) The provision of a teaching device which is simple in construction and thus can economically be produced.

Figure 7:
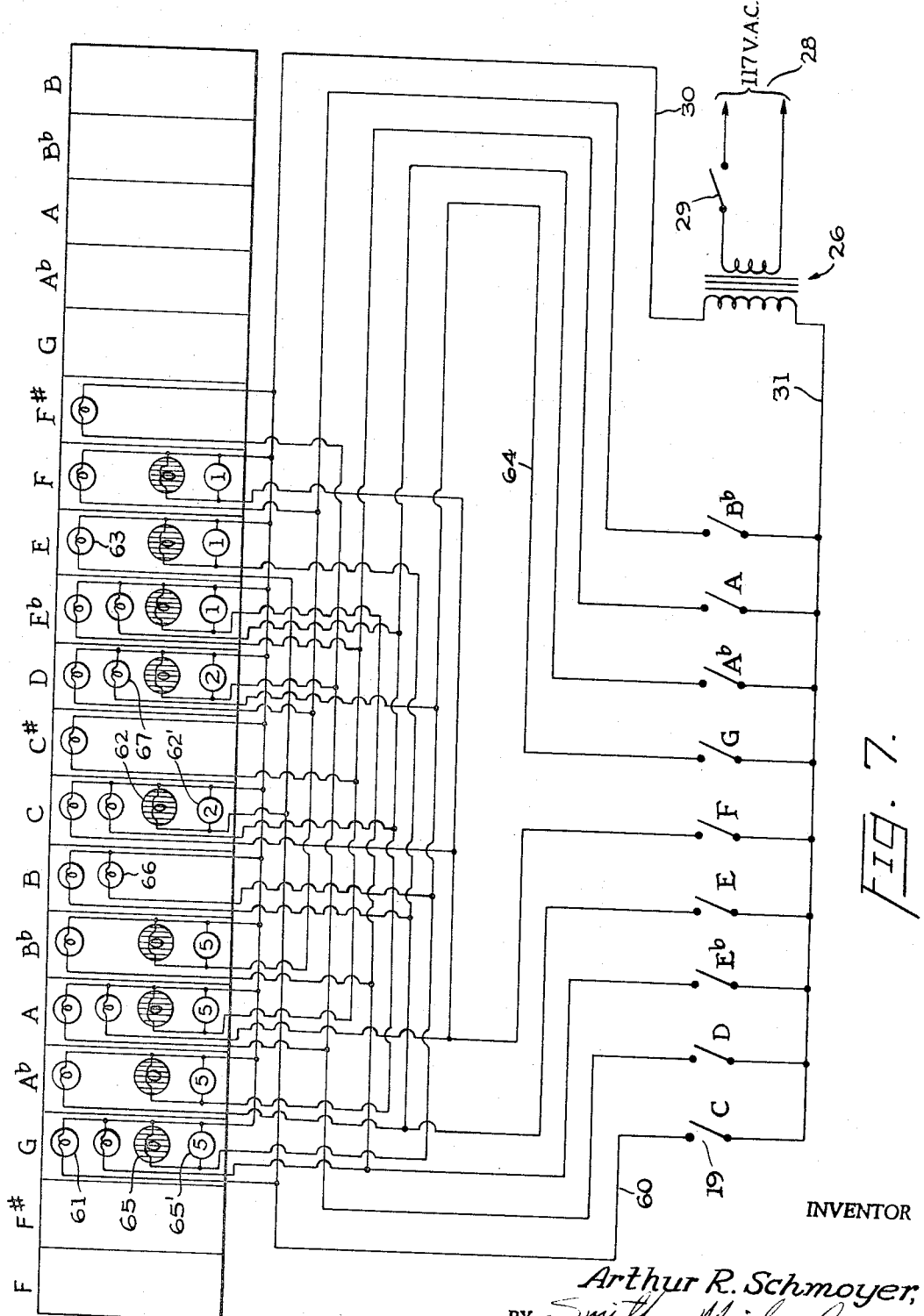

These and other self-evident advantages and objects of the invention will be better understood by a consideration of the ensuing specification and the accompanying drawings which illustrate preferred embodiments of the invention, and in which, FIGURE 1 is a perspective view of an organ showing the location of the visual indicators of this invention, FIGURE 2 is a perspective view of the visual indicator panel and keyboard of one embodiment of the invention, including a portion in cross section, FIGURE 3 is a cross section through the pedal keyboard showing a sensing switch of one embodiment of the invention, FIGURE 4 is a view similar to FIGURE 2 but of a second embodiment of the invention, FIGURE 5 is a view similar to FIGURE 3 but of the second embodiment of the invention, FIGURE 6 is a schematic diagram of the circuitry of one embodiment of the invention, FIGURE 7 is a schematic diagram of the circuitry of a second embodiment of the invention, and FIGURE 8 is an instructional diagram used with the embodiment of FIGURE 7.

Referring to the drawings, and particularly to FIGURE 1, the invention is illustrated in an embodiment applied to a conventional console, indicated generally at 1. The console includes two manual keyboards, conventionally termed a swell manual 2 and a great manual 3, and a bass pedal keyboard 4. The teaching device of this invention comprises an indicator panel including a plurality of indicating elements comprising indicia 5 disposed in a position of visual association with a keyboard. As illustrated in FIGURE 1, each indicia 5 of this embodiment is disposed to the rear of its associated key on the great manual 3, but it should be appreciated that the indicating elements may also be associated with the swell manual 2 in order to expand the capability of the teaching device to include additional higher octaves. The indicia 5 may be disposed within the console panel 6 (FIG. 2) as an integral part of the organ as originally constructed, or the indicating elements may be disposed within a panel 6' separate display unit 7 comprising a portable unit which may be placed over the manual keyboard of a conventional organ as shown in FIGURE 4.

In order to provide the student with a guide to the keys of the keyboard 3 and their association with the position of the corresponding notes on the cleft, there may be provided an overlay 8 of translucent material so as to reveal the indicia 5 therebehind and including a chart of the keys, the note designations, and the position of the corresponding note on a cleft. This overlay may be attached to the panel 6 in any suitable manner, but is shown in FIGURE 2 (partially withdrawn to reveal the indicia 5) as received between and in sliding engagement with track elements 9, 9' disposed on the panel 6.

Alternatively, the overlay 8 may be opaque and of a color to match the organ console, in which case it would be used as a mask to obscure the indicia 5 when the teaching device is not in use.

The indicating elements of this embodiment each comprise a single indicia 5 such as an indicating lens in light communication with the interior of a lamp box 10. The lenses may be appropriately colored to distinguish between those associated with white keys and those associated with black keys. Thus, in a preferred embodiment, the white keys are designated by a white lens, and the black keys by a red lens. Disposed within the lamp box 10 are one or more lamps 11, each of which is connected to a common return or ground circuit 12 and to a separate lead 13 of a cable 14 leading to the sensing means associated with the pedal keyboard 4.

The pedal keyboard 4 comprises a plurality of pedal keys 15 pivoted at point 16. Pressure by the foot applied downwardly as indicated by the arrows in FIGURES 3 and 5 serves to pivot the pedal key 15 about the pivot point 16 and thus move the rear portion of the pedal upwardly. The sensing devices, indicated generally at 17 and 18, comprise a microswitch 19 in operative association with the aforesaid rear portion of each pedal key 15, and having an actuator 21 contacting the rear portion of the key 15 or an extension 23 thereof whereby depression of the key closes the switch 19.

The sensing devices may be constructed as an integral part of the organ console, as indicated in FIGURE 3 or as a portable unit which may be used with a conventional organ not originally equipped with the teaching device of this invention, as shown in FIGURE 5.

The microswitches 19 are supported in any suitable manner, preferably as illustrated in FIGURE 3 by a shelf 24 attached to the rear of the console foot panel 25. The shelf 24 may also serve to support a power supply transformer 26 and the cable 14 from the indicating elements. In the portable unit of FIGURE 5, the microswitches 19 are supported in a housing 27 disposed above the rear portion of the pedal keys 15 and supported in any suitable manner such as by adjustable floor supports 20 at the ends adjacent to the pedal keyboard 4.

The operative interconnection between the sensing means and the indicating elements is best understood by reference to the schematic circuit diagram of FIGURE 6. Electrical power is derived from a suitable source 28 and applied to the primary of transformer 26 through power switch 29, preferably located at a readily accessible point (not shown) near the console keyboards. The secondary winding of the transformer 26 supplies a suitable voltage of say 12 volts to leads 30, 31, thus establishing through lead 30 a common or ground circuit and through lead 31 a bus connection to one side of each of the microswitches 19. Each microswitch is associated with an independent circuit including the lamps of the indicating elements visually associated with the manual keys to be depressed simultaneously with depression of the pedal key activating that particular microswitch. While the schematic diagram of FIGURE 6 includes the circuits of each of the nine switches shown, the ensuing description will be simplified by confining it to the circuit of the microswitch 19 designated as associated with the bass C pedal. It is evident that the circuits associated with each additional microswitch is identical in function, differing only in the particular indicating elements actuated thereby.

In its simplest form, the apparatus of this invention would comprise circuitry involving direct electrical interconnection between each microswitch and the lamps comprising the indicators visually associated with a particular chord triad to be played with the particular pedal key activating the microswitch. Circuitry could be established to include indicators associated with any desired chord variation, such as fundamental, 1st inversion, or second inversion, but once established would give no visual indication of the keys to be used in other variations or other octaves, the student being left on his own in this regard. In order to enable the student to select variations of a basic chord pattern and to obtain visual indications thereof, a preferred embodiment of the invention includes in the interconnecting circuitry a variance selector switch which may be controlled in any convenient manner, such as by a lever including a yoke disposed so as to be engageable by the student's right knee (see FIG. 1). The multiple circuit switch may be of the well-known stacked wafer type or drum type having a movable element shown diagrammatically as 35 (FIGURE 6). This element is of non-conductive material and has a plurality of conductive strips, as at 34, disposed in spaced relationship thereon and thus electrically isolated from each other. Each conductive strip 34 includes a continuous contact portion 36 and a laterally offset portion 37 extending over a segment only of the total travel of the element 35. By virtue of the brush contactor 33 in sliding contact with the continuous portion 36, each conductive member 34 is maintained in continuous electrical communication with its respective microswitch 19 throughout the entire travel of the movable element 35 in the directions indicated by the arrows of FIGURE 6. Disposed in the path of travel of the offset or discontinuous portion 37 of the conductive element 34 are a plurality of indicator brushes 40, 41, 42, 43, each of which is connected to an indicator lamp through leads 44, 45, 46, 47 respectively. Thus, brush 40 is connected to lamp 50 which is disposed in a lamp box 10 of the indicating element which is visually associated with the manual key for the note G. Similarly, the brush 41 is connected to a lamp 51 associated witth the key for the note C, and brush 42 with E. Brush 43 is connected to lamp 53 associated with an indicator again designated G, but in a position of visual association with the key for the note G in the next highest octave. Thus, in the switch position shown in FIGURE 6, depression of the pedal 15 for the bass note C, a circuit is established from the power supply through microswitch 19, lead 32, brush 33, conductive strip 34 which has its offset portion in contact with brushes 40, 41 and 42 (but not 43), through leads 44, 45, 46 to lamps 50, 51, 52 and through lead 12 to ground return. By this circuit, depression of the C bass pedal is effective to illuminate a lamp in the indicators visually associated with the keys for the chord triad G, C, E respectively, which is the second inversion of the C chord. If, on the other hand, it is desired to provide an indication of the keys appropriate to a variance of the chord, the multiple circuit switch is manipulated to move the movable element 35 to the right as indicated in FIGURE 6, with the result that the contact to brush 40 would be broken to extinguish lamp 50 while contact with brush 43 would be established to illuminate lamp 53. Thus, the lamps 51, 52, 53 associated with indicators for the notes C, E, G, or the fundamental position for the C chord, would be illuminated.

It will be noted that the circuit of FIGURE 6 includes more than one lamp in a lamp box 10 for several of the indicators. This is done in order to maintain electrical isolation of the circuits of the various pedal switches where a particular manual key plays a part in more than one bass chord combination. It will be evident, however, that this electrical isolation can be maintained by other means known to those skilled in the electrical arts, as by the use of relays or isolation diodes.

In operation, a student is encouraged to make use of conventionally written music in the early stages of instruction. Once the student has mastered the simple technique of playing the melody with the right hand, he has only to identify the chord to be played, depress the appropriate bass pedal and refer to the activated indicia which are visually associated with the three keys to be depressed with the left hand to form the chord triad. To vary the makeup of the triad between fundamental and first or second inversions, it is only necessary to move the variance selector switch actuator 54 to a position corresponding to the desired variance. Thus, the studentt in his initial instructional phases is encouraged to recognize the chords in each variance as they appear in conventionally written music, and to attempt the variations while sustaining the bass note. The simultaneous indication of the appropriate triad of notes with depression of the pedal key enables him to become acquainted with the chords as integral harmonious sound, thereby establishing a concept particularly essential to a sustained sound instrument such as the organ.

In a second embodiment, a still further refined teaching technique is used in order to acquaint the student with the variances of commonly used chords while at the same time indicating to the student the particular fingers to be used. In one well-known teaching technique, the student's index finger is termed the pointer and is used to point to and play the note which identifies the chord to be played. The triad is formed by using the thumb to depress a key two notes up the scale from the pointer finger and the little finger to depress a key three notes down from the pointer finger. This forms a chord in the second inversion only, and does not enable the student to form the variances usually encountered in harmoniously complete music. In contradistinction, the second embodiment of this invention, shown schematically in FIGURE 7, uses what I term the 5-2-1 system of instruction. In this system, the student's fingers are numbered 1 to 5 starting with the thumb as number 1, the index finger as number 2 and through to the little finger as number 5. While the same numbering system is used for both hands, this invention is concerned with the left hand as it is used in forming chord triads. A study of the chord triads, which comprise the 1st, 3rd and 5th notes of any scale, reveals that each triad lends itself to be played with the 5th, 2nd, and 1st fingers, but that the chord designation corresponds to the key in the center position (i.e., to be depressed with the 2nd, or pointer, finger) only in the case of the second inversion. In the fundamental or root mode, the chord is identified by the lowermost note, which is played with the number 5, or little finger. In the case of a first inversion, the chord is identified by the uppermost note, which is played with the number 1 finger. Thus, in the 5-2-1 system, the student learns to identify a fundamental chord with the fifth finger, a 2nd inversion with the second finger, and a 1st inversion with the first finger.

To the end that the visual indications may facilitate this identification, the embodiment of FIGURE 7 adds to the previously described indications a distinctive color coded indicator visually associated with the note by which the particular chord is identified, and an additional indicia identifying the finger to be used on the key associated with that note. The particular wiring shown schematically makes use of the recognition that the chords G, Ab, A, Bb are most commonly played in the fundamental mode, the chords C and D in the 2nd inversion, and the chords Eb, E, and F in the 1st inversion. It is obvious, however, that departures from this particular schematic can be made, or that the variance selector switch of FIGURE 6 can be utilized to add versatility to this embodiment. For simplicity, however, this description is confined to this particular association of chords in a single octave.

As in the case of the earlier described embodiment, the device of FIGURE 7 receives its power from any suitable source 28 through a power switch 29, transformer 26, and common supply line 31. Switches 19 are each associated with a pedal key as identified by the appropriate letter on the schematic. For purposes of description, let us assume that the C chord is desired. Depression of the C pedal will close the associated switch 19-C, energizing line 60 and lamps 61, 62 and 62', and 63, which lamps serve to illuminate the indicia visually associated with the manual keys for the notes G, C and E, respectively. In order to indicate the note C as the note by which chord is identified, lamp 62 is distinctively color coded, in this case indicated on the schematic as red. To further identify the finger, which is to be used on this key, lamp 62' is provided in a parallel circuit to lamp 62. This lamp 62' is effective to illuminate a portion of the panel 6 which bears an indicia of the numeral 2, thus displaying to the student an indication that the second finger is to be used in depressing the C key. The C chord is now being formed by the fifth finger on G key (white light), second finger on C key (red light, numeral 2 illuminated) and the first finger on E key.

Should the music call for a change from the C chord, being played in the second inversion, to the G chord (in the fundamental mode), the foot is moved to the G pedal, closing switch 19-G, energizing line 64 and activating lamps 65 and 65', 66 and 67. On the display panel 6, the effect is to change the indication associated with the G key from a white illumination to red and to simultaneously illuminate an indicia of the numeral 5, while providing white indications with the keys B and D. Thus, the student is shown that the number 5 finger does not move from the G key even though the chord designation has changed from C to G. The only movement is that of the 2 and 1 fingers wherein the key B is depressed with the 3 finger and the 1 finger drops one note to the D key.

By reference to the instructional diagram of the 5-2-1 system of instruction set forth in FIGURE 8, it is seen that the fundamental chords are "built up" the scale from the fifth finger, or root note, as in the case of G, A♭, A and B♭, chords, and that the minor of each chord is formed by moving the number 3 finger down ½ note, or step. Also, it can be seen that the second inversion, as in the case of the C and D chords, its built both ways on the scale from the second finger, and the minor chord formed by moving finger number 1 down ½ step. Similarly, the first inversion (chords E♭, E and F) is "built down" the scale from the first finger, and the minor played by moving finger 5 down ½ step.

In each case, the note appearing as an enlarged figure in a cycle is presented on the panel in distinctive form, as by a red light, and an indicia is simultaneously displayed to indicate the finger to be used in depressing the associated key. Thus, by the use of the aforedescribed 5-2-1 system of instruction with the apparatus of this invention, the student is initially instructed in the selection of keys to make up a chord triad with the fingers that will be used throughout his progression to advance stages of proficiency.

It is obvious that the essence of this second embodiment could be incorporated in a teaching device in which the activation of the identifying elements is by means other than the pedal keys, such as by a recorded media as set forth in my aforementioned copending applications, but where the identifying elements include the aforementioned distinctive element signifying the key which corresponds to the note by which the chord is identified in the particular chosen variance.

This invention is not limited to the use of the specific circuitry or structure set forth herein inasmuch as the specific details are for illustrative purposes only and constitute only a preferred embodiment of the invention, which is of a scope defined in the following claims.

Having thus described my apparatus, what I claim as invention and desire to secure by United States Letters Patent is:

1. A visual chord teaching device for a keyboard musical instrument including a manual keyboard and a pedal keyboard, said device comprising a plurality of indicating elements, each said element disposed in a position of visual association with a key of said manual keyboard, a plurality of sensing means each operatively associated with and responsive to depression of a respective key of said pedal keyboard, and means operatively interconnecting each said sensing means with certain of said indicating elements whereby depression of said respective key of said pedal keyboard activates said certain indicating elements to visually identify the keys of said manual keyboard to be depressed in order to play a chord corresponding to a bass note sounded by said depressed key of said pedal keyboard.

2. A visual chord teaching device as set forth in claim 1 wherein each said visual indicating element comprises an indicia and one or more electro-responsive means associated with each said indicia for activating said indicia from a passive mode to an indicating mode, and wherein said sensing means comprise electric switch means and said interconnecting means comprise electric circuits operatively connecting each said switch with the electro-responsive means associated with said certain indicating elements.

3. A visual chord teaching device as set forth in claim 2 wherein said electro-responsive means is a lamp.

4. A visual chord teaching device as set forth in claim 2 wherein each said indicia is disposed on a panel of said console adjacent to its visually associated manual key, and each said electro-responsive means comprises one or more lamps disposed behind said panel in light communicative relationship with said indicia.

5. A visual chord teaching device as set forth in claim 2 wherein said visual indicating elements are disposed in an indicator box adapted to be placed on said manual keyboard to establish said position of visual association between said indicating elements and said manual keys.

6. A visual chord teaching device as set forth in claim 3 including an overlay for said indicia, said overlay comprising a chart of key designations.

7. A visual chord teaching device as set forth in claim 2 wherein said interconnecting electric circuits include switch means effective to vary said operative connection whereby the selection of elements comprising said certain indicating elements is varied.

8. A visual chord teaching device as set forth in claim 1 wherein one of said certain of said indicating elements includes an identifying mode, a visual association of said one element being with the key corresponding to the note by which said chord is identified.

9. A visual chord teaching device as set forth in claim 8 and including an additional indicia actuated concurrently with said one element, said additional indicia including a designation of the particular finger to be used in depressing said corresponding key.

References Cited
UNITED STATES PATENTS

| | | | |
|---|---|---|---|
| 1,324,276 | 12/1919 | Schantz | 84—478 |
| 2,223,009 | 11/1940 | Rupp et al. | 84—478 |
| 2,547,535 | 4/1951 | Pierce et al. | 84—478 |
| 3,153,365 | 10/1964 | Redmond | 84—478 |

RICHARD B. WILKINSON, *Primary Examiner.*

C. M. OVERBEY, *Assistant Examiner.*